(12) United States Patent
Garwood

(10) Patent No.: US 9,167,843 B2
(45) Date of Patent: Oct. 27, 2015

(54) MECHANICAL PROCESSES FOR SEPARATING TALLOW AND LEAN BEEF FROM A SINGLE BONELESS BEEF SUPPLY

(76) Inventor: Anthony J. M. Garwood, Mercer Island, WA (US)

( * ) Notice: Subject to any disclaimer, the term of this patent is extended or adjusted under 35 U.S.C. 154(b) by 230 days.

(21) Appl. No.: 13/489,291

(22) Filed: Jun. 5, 2012

(65) Prior Publication Data

US 2013/0323384 A1 Dec. 5, 2013

(51) Int. Cl.
*A23L 1/317* (2006.01)
*A23L 1/31* (2006.01)

(52) U.S. Cl.
CPC .. *A23L 1/317* (2013.01); *A23L 1/31* (2013.01)

(58) Field of Classification Search
CPC .............. C11B 3/00; C11B 3/16; A23L 1/31; A23L 1/312; A23L 1/3177; A22C 17/00; A22C 17/0006; A22C 17/002
USPC .................. 426/480, 646, 645, 641, 608, 518
See application file for complete search history.

(56) References Cited

U.S. PATENT DOCUMENTS

| | | | | |
|---|---|---|---|---|
| 1,585,794 | A * | 5/1926 | Sorensen | 209/326 |
| 2,281,590 | A * | 5/1942 | Newton | 241/2 |
| 3,225,926 | A * | 12/1965 | Dostatni | 209/315 |
| 3,780,191 | A | 12/1973 | Langer | |
| 3,851,074 | A * | 11/1974 | Gillespi | 426/231 |
| 5,147,672 | A | 9/1992 | McLachlan | |
| 5,215,772 | A * | 6/1993 | Roth | 426/231 |
| 5,378,418 | A | 1/1995 | Berger | |
| 5,384,149 | A * | 1/1995 | Lin | 426/646 |
| 5,435,443 | A | 7/1995 | Hohenester | |
| 5,552,173 | A | 9/1996 | Singh | |
| 5,800,537 | A * | 9/1998 | Bell | 424/93.1 |
| 6,036,630 | A | 3/2000 | Robey | |
| 6,123,945 | A | 9/2000 | Nakatsu | |
| 6,172,246 | B1 | 1/2001 | Franke | |
| 6,183,795 | B1 * | 2/2001 | Yates | 426/385 |
| 6,224,930 | B1 | 5/2001 | Inglis | |
| 7,455,704 | B2 | 11/2008 | Garwood | |
| 7,666,456 | B2 | 2/2010 | Garwood | |
| 8,137,722 | B2 | 3/2012 | Garwood | |
| 8,178,144 | B2 | 5/2012 | Garwood | |
| 2001/0007690 | A1 | 7/2001 | Girsh | |
| 2002/0134317 | A1 | 9/2002 | Shane | |
| 2010/0112168 | A1 | 5/2010 | Garwood | |
| 2011/0008505 | A1 | 1/2011 | Garwood | |
| 2012/0060409 | A1 | 3/2012 | Garwood | |
| 2012/0141645 | A1 * | 6/2012 | Tomcak et al. | 426/480 |
| 2012/0171345 | A1 * | 7/2012 | Kelleher et al. | 426/546 |
| 2012/0171352 | A1 * | 7/2012 | Kelleher et al. | 426/657 |

FOREIGN PATENT DOCUMENTS

RU SU 1473846 * 4/1989

* cited by examiner

*Primary Examiner* — Anthony Weier
(74) *Attorney, Agent, or Firm* — Christensen O'Connor Johnson Kindness PLLC

(57) ABSTRACT

A method for separating fat from beef pieces containing fat. The method includes, with an apparatus, reducing the size of beef pieces containing fat when the fat is in a brittle condition into a mixture of particles that comprise predominantly fat and particles that comprise predominantly lean; and, with an apparatus, separating the fat particles from the lean particles based on color differences or size differences.

13 Claims, 9 Drawing Sheets

MECHANICAL PROCESSES FOR SEPARATING TALLOW AND LEAN BEEF FROM A SINGLE BONELESS BEEF SUPPLY

BACKGROUND

During the process of boning a carcass, and particularly a beef carcass such as a steer or cow, the tallow and fat often referred to as "trim" is removed. Other "trim" is cut from primal beef portions during the slicing and disassembly process of carcasses that is required during preparation of small cuts for human consumption. During these processes, a significant amount of lean beef can be cut from the carcass and carried away with the fat and/or tallow. Lean beef comprises predominantly muscle protein, although some amounts of fat and tallow are present, while fat and tallow comprise predominantly glycerides of fatty acids with connective tissue and collagen and are the predominant constituents of plant and animal fat. The lean beef content in trim may be as high as 45% to 50% by weight, or higher. Presently, trim has little use except for sausage production, or alternatively the fat may be rendered.

A need therefore exists to more efficiently separate the lower value tallow with fat from the higher value lean beef contained in trim and to more effectively kill, reduce, or completely remove the microbial pathogenic population and to eliminate sources of cross contamination and recontamination, while also producing a ground beef product of specific fat content.

SUMMARY

Disclosed are methods relating to the reduction in the tallow content and/or the separation of tallow and/or fat from materials, particularly for foods used for human consumption, including fresh, uncooked meats, and in particular beef. Applicant has made numerous contributions to the processing of beef, and in particular to the separation of fat from beef to produce beef products having a desired content of fat, including processes that perform decontamination of the beef with such separation. The following applications are expressly incorporated herein by reference in their entirety: U.S. application Ser. No. 13/024,965, filed on Feb. 10, 2011; Ser. No. 12/968,045, filed on Dec. 14, 2010; Ser. No. 12/520,802, filed on Jan. 12, 2010; Ser. No. 13/024,178, filed on Feb. 9, 2011; Ser. No. 11/720,594, filed on Apr. 30, 2009; Ser. No. 12/697,592, filed on Feb. 1, 2010; Ser. No. 13/422,740, filed on Mar. 16, 2012; Ser. No. 13/355,953, filed on Jan. 23, 2012; Ser. No. 13/324,744, filed on Dec. 13, 2011; and Provisional Application Nos. 61/595,537, filed on Feb. 6, 2012; and 61/617,511, filed on Mar. 29, 2012.

Tallow comprises natural proportions of fat, collagen, and connective tissue. Fat is a single component contained within tallow. Disclosed herein is a method and apparatus for separating lean beef from fat contained within the lean beef component without destruction of the muscle striations or reduction to small lean particulates. The method includes reducing the temperature of at least the fat component of the beef to a temperature causing solidification of the fat and to a brittle condition so that when a crushing action is applied to the temperature-reduced pieces of beef, the crushing force is sufficient to cause fracturing and the substantial disintegration or fragmentation or breaking up of the fat matter into small fat particles or fragments that readily fall away from the lean beef, but without significantly damaging the lean matter.

In one embodiment, a method for separating fat from beef pieces containing fat is disclosed. The method includes, with an apparatus, reducing the size of beef pieces containing fat into a mixture of fat particles that comprise predominantly fat and lean particles that comprise predominantly lean, wherein the fat particles are on average smaller than the lean particles, and, with an apparatus, separating the fat particles from the lean particles based on size differences between the fat particles compared to the lean particles.

The beef pieces may be chilled to a temperature to render the fat brittle, and then, crushing the beef pieces to cause the fat to break away from the lean as small particles.

The method may further include processing the mixture of particles in a vibrating sieve.

The method may further include emulsifying the fat particles into an emulsification of oily material and solids, pasteurizing the oily material and the solids, and centrifuging the emulsification to separate the solids from the oily material.

The method may further include combining the solids with the lean particles.

The method may further include combining the lean particles with a measured amount of the fat particles after the fat particles have been separated from the lean particles.

In another embodiment, a method for separating fat from beef pieces containing fat is disclosed. The method includes, with an apparatus, reducing the size of beef pieces containing fat into a mixture of particles that are one of two colors, wherein fat particles that comprise predominantly fat are a first of the two colors and lean particles that comprise predominantly lean are a second of the two colors, and, with an apparatus, separating the fat particles from the lean particles based on the fat particles being the first color, and the lean particles being the second color.

The beef pieces are chilled to a temperature to render the fat brittle, and then crushing the beef pieces to cause the fat to break away from the lean as particles having the first of two colors.

The method may further include scanning the mixture of particles to identify the color of individual particles, and separating the particles that have a similar color.

The method may further include arranging the particles on a conveyor, scanning the particles, and removing the particles that have a similar color from the conveyor.

The method may further include arranging individual particles in a row on the conveyor, and in the direction of travel of the conveyor, and removing the particles by applying compressed gas.

The method may further include emulsifying the fat particles into an emulsification of oily material and solids, pasteurizing the oily material and the solids, and centrifuging the emulsification to separate the solids from the oily material.

The method may further include combining the solids with the lean particles.

The method may further include combining the lean particles with a measured amount of the fat particles after the fat particles have been separated from the lean particles.

A method for separating fat from beef pieces containing fat is disclosed. The method includes, with an apparatus, reducing the size of beef pieces containing fat when the fat is in a brittle condition into a mixture of particles that comprise predominantly fat and particles that comprise predominantly lean and, with an apparatus, separating the fat particles from the lean particles based on color differences or size differences.

In one embodiment, the stream of fat and lean particles that are produced in the bond-breaking device are transferred to a vibratory separator. A vibratory separator can separate a portion of the fat particles while agitating and shaking the larger lean pieces so as to cause even more fat particles to separate from the larger lean beef pieces. In this embodiment, the smallest pieces of fat that are separated can be transferred directly to the low temperature rendering section. A vibratory separation can include one or more sieves of different mesh size so as to separate different size particles on each mesh. In one embodiment, the vibratory separation can have a single sized mesh, so as to separate the smallest pieces of fat. The separation through the vibratory separator should be such that the fat particles that pass through the sieve do not contain any lean beef. In this case any particles that are fat with any amount of beef are left in the beef stream to be separated in the buoyancy separator. The method can be practiced with any material containing fat, not just beef, including plants and animals.

A method is disclosed that includes preparing diced beef pieces having been completely frozen to a temperature, for example, below 27 F and most preferably to about 15 F or lower, such that the consistency of the frozen beef pieces is hard but is not frozen to a temperature so low that the pieces resist crushing. The treatment comprises the application of a crushing force most preferably from opposing sides of the frozen beef and in a way that traps the beef pieces between, for example, a pair of horizontally opposed, counter- or co-rotating, rigid rollers that apply a crushing force to the beef pieces, and with the rollers rotating such that when the frozen beef is dropped into the space between the rollers, the space is about half the size of the diced beef pieces and the rollers rotate so as to carry the frozen beef in a downward direction. This treatment is arranged to reduce the size of the frozen diced beef to particles wherein the frozen fat has fractured and crumbled into smaller crumb like particles and separated from the larger pieces of lean beef. The diced beef is compressed such that the fat fractures and breaks into smaller particles that are generally smaller than the lean component, which, due to its fibrous properties, resists fracturing and tends to remain unaffected by the crushing force. Following crushing, the stream of beef particles comprises pieces of fat that are substantially fatty adipose tissue with no or very little visible lean attached, while the lean particles are mostly larger than the fat particles and comprise mostly lean after the fat has fractured into crumbs and fallen away from the lean.

The particles can then be separated based on size owing to the differences in size between the particles that are predominantly fat and the particles that are predominantly lean, or the particles can be separated based on color owing to the differences in color between the particles that are predominantly fat and the particles that are predominantly lean.

The particles can be treated at any time by combining them with a fluid that comprises filtered, clean water, or carbon dioxide and water, carbonic acid (or liquid carbon dioxide), or any suitable organic acid such as ascorbic acid, acetic acid, per-acetic acid, acidified sodium chlorite. Additionally, or alternatively, the fluid may comprise an alkaline agent. The fluid can be clean, potable water or other fluids or a combination of fluids with agents. Fluids may include water, or fluid carbon dioxide, or both. The fluid may further include acids, either organic or inorganic, and alkaline agents. Acids include, but are not limited to carbonic acid (water and carbon dioxide), lactic acid, ascorbic acid, acetic acid, citric acid, peracetic acid also known as acid ($CH_3CO_3H$). Alkalinity of the fluid may be raised by adding an alkali substance, such as ammonia, ammonium hydroxide, sodium hydroxide, potassium hydroxide, calcium hydroxide, tri-sodium phosphate, and any other suitable alkali. Additives such as sodium chloride, sodium chlorite, and sodium hydroxide may be added, which can be followed by addition of a suitable acid (to provide acidified sodium chlorite).

DESCRIPTION OF THE DRAWINGS

The foregoing aspects and attendant advantages will become more readily appreciated as the same become better understood by reference to the following detailed description, when taken in conjunction with the accompanying drawings, wherein.

DETAILED DESCRIPTION

The term "fat" as used herein can mean fat and tallow when used in reference to animal matter. Throughout the description "beef" may be used as a representative material that can be used in the disclosed methods. However, it is to be appreciated that the disclosed methods can be practiced not only on beef, but on any meat, such as from poultry, pork, seafood, and the like.

The disclosed method is a process for the processing of beef and, specifically, a process for separating lean beef and fat from boneless beef and producing a product of specified fat content, and treating the product to deactivate and/or destroy pathogens. However, the beef need not be boneless. In one embodiment, beef with bone fragments may also be processed in accordance with the disclosure.

From the description herein, a method for producing a lean beef product is disclosed. The method includes: reducing the size of beef into particles, wherein the particles are either predominantly fat particles or predominantly lean particles; and separating the fat particles and the lean particles based on a size or color difference. The method may further include: emulsifying the fat particles into an emulsification of oily material and solids; pasteurizing the oily material; centrifuging the emulsification to separate solids from the oily material. The method may further include combining the solids with the lean particles. The method may further include combining the lean particles with a measured amount of the fat particles, after the fat particles have been separated from the lean particles. The method may further include treating the lean particles under reduced pressure to adjust water content and lower the temperature of the beef product to produce a controlled water content beef product. The method may further include chilling the beef to a temperature at which the fat will break off from lean beef through application of pressure and applying pressure to break off fat from lean and produce the particles that are either predominantly fat particles or predominantly lean particles.

Figure 1:
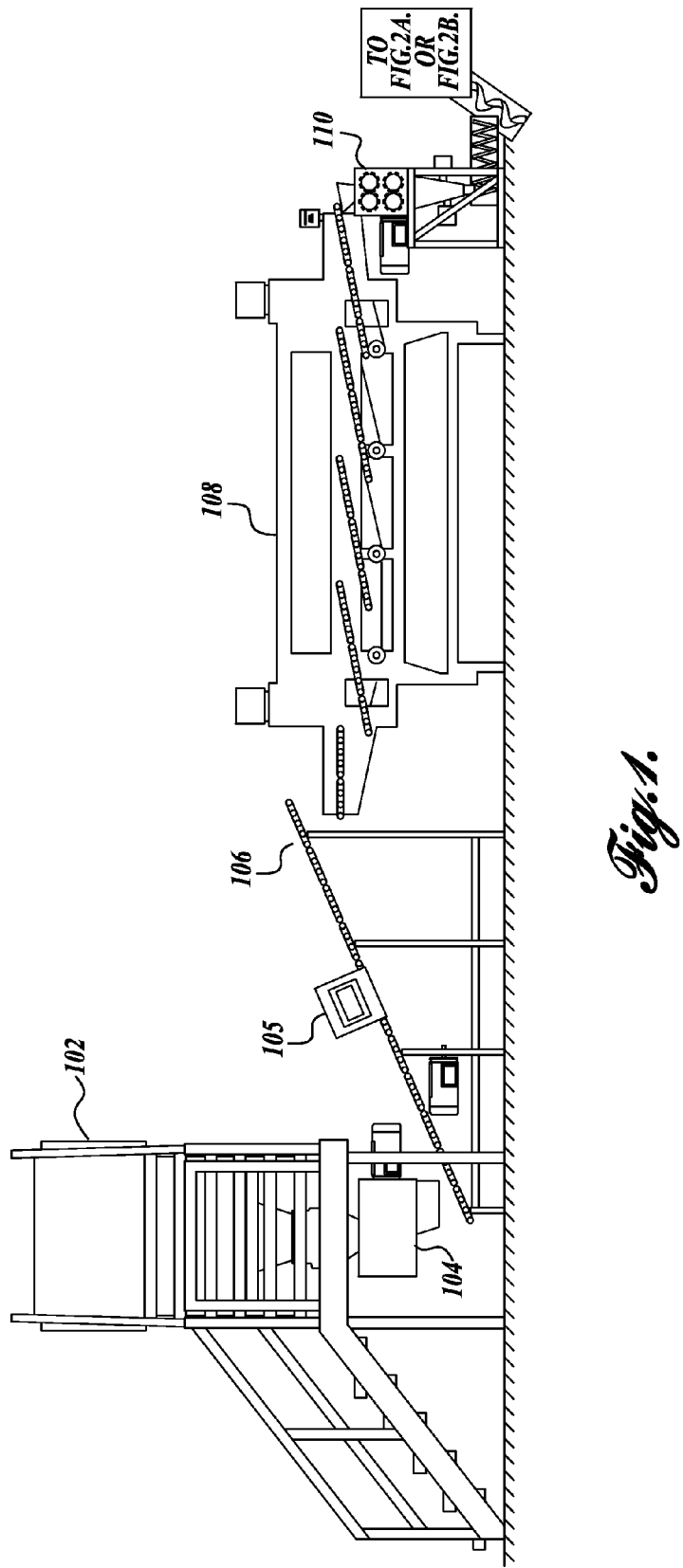
FIG. 1 is a schematic illustration of a process for the separation of lean beef from boneless beef containing lean beef and tallow.

FIG. 1 illustrates the first steps in the process of separating the lean beef from animal matter that is a combination of fat and lean matter. A representative animal matter may be high fat trim byproduct from beef slaughterhouses. Generally, the animal matter is any boneless beef. In one embodiment, the source materials can comprise a combination of what is commonly known as 50's and 65's boneless beef, or any other suitable boneless beef. However, in other embodiments, the beef may combine bone and cartilage. All materials coming in contact with the boneless beef or any parts thereof, such as lean beef and fat are made from food grade materials, such as stainless steel and suitable polymers, such as nylon, polyethylene, polypropylene, and the like. Furthermore processing equipment may be housed in an enclosed building within a cooled environment and, kept at a temperature near the freezing point of water. Also, instrumentation, such as temperature, level, pressure, flow, density, and mass meters, is provided where necessary to provide status of and/or maintain control of the product through the many components of the system.

The boneless beef, which may include sizable chunks, is loaded onto hopper 102. Hopper 102 represents a vat dumper that may unload any quantity of animal matter containing fat and lean, such as for example, the unloading of containers of approximately 2,000 lb of beef followed by size reduction equipment, such as slicing device 104. From hopper 102, the beef is fed by gravity to a slicer 104. The slicing device 104 is designed to slice and dice the beef and reduce beef to a size, for example, of about 1 inch in cross section by 2 inches or less. While not limiting, the small pieces are size reduced to approximately not more than about 1 inch wide and 2 inches long strips or 2 inch cubes. The individual beef pieces of diced beef may still contain an amount of fat and an amount of lean. Slicing device 104 provides a steady flow of beef pieces to inclined conveyor 106.

The sliced and diced beef pieces continue along the inclined conveyor 106, and are delivered to the entry of a chilling tunnel 108. The chilling tunnel 108 is for chilling the beef to a temperature at which the fat will break off from lean beef through application of pressure that breaks off fat from lean and produces particles that are either predominantly fat particles or predominantly lean particles. Processing of the diced beef pieces through the chilling tunnel 108 results in differences in temperature between the fat and the lean matter in each of the individual beef particles, such that the fat is at a temperature that renders the fat brittle and prone to breaking, and can be separated from the lean by the application of pressure, similar to a crushing force that can break free of the lean matter, and the lean is at a temperature that is pliable and does not result in the lean matter breaking free through the same application of pressure. However, the lean matter is chilled to a temperature at which water within the lean matter can freeze and expand, thus, reducing the density of such lean matter. For example, in one embodiment, the temperature of the beef pieces should be not more than, for example, 29° F. and not less than 0° F., or for example, about 15° F. to about 24° F.

The input temperature of the beef particles to the tunnel 108 may be about 32° F. to 40° F., but preferably about 32° F. The temperature of the beef before the tunnel freezer 108 may be controlled, in general, by adjusting the temperature of the room in which the beef is being diced. Owing to the differences of heat transfer between fat and lean in each beef piece and respective amounts of water in lean versus fat matter, the chilling tunnel 108 results in different temperatures of fat and lean within each beef piece.

It has been realized that the temperature of the individual pieces that exit the chilling tunnel 108 is not uniform throughout the particles. Because of the different heat transfer rates of fat and lean as well as the different percentages of water within lean and fat, the temperature of the lean will be higher than the temperature of the fat, even of the same piece. The temperature reduction is carried out to result in lean matter that remains flexible due to the cohesive properties of muscle tissue, while the fat is cooler at the surface and is in a brittle and friable condition due to the lower temperature. However, because the lean contains greater amounts of water than fat, the water is frozen or partially frozen.

In one embodiment, flooding the tunnel 108 enclosure with 100% carbon dioxide gas displacing what would otherwise be air is advantageous. In this way, carbon dioxide gas can be recycled through evaporators. Another purpose in the use of carbon dioxide is to displace air (and therefore atmospheric oxygen), thereby inhibiting the formation of oxymyoglobin from the deoxymyoglobin exposed at the cut lean surfaces of each dice or beef particle when diced or sliced.

The temperature of the quickly frozen beef particles when exiting the tunnel 108 is controlled such that lean matter comprising substantially muscle striations, will freeze the water and all naturally fluids. Water represents about 70% of lean matter, and thus the freezing and expansion of water when frozen contributes a significant increase in volume with a corresponding decrease in density of the lean matter. The beef pieces are in a solid phase but in such a way that the physical characteristics and properties of the lean matter is pliable and "rubbery" in texture, while the fat matter is friable such that it fractures when subjected to compressive and twisting actions and will crumble readily into small particles and be freed from the lean matter. The temperature to which the beef pieces are reduced needs to alter the physical condition of the beef pieces so as to facilitate the flexing of the muscle striations of the lean matter without causing it to fracture and break into smaller pieces, while simultaneously rendering the fat matter friable such that it will fracture, crumble, and break into smaller separate particles. In this way, the friable fat having broken away from the lean when it is flexed, crushed, bent, or twisted thereby reduces the fat matter into small separated particles. Hence, these are referred to herein as "fat particles." The beef pieces remaining after fat is broken off are relatively larger comprising mostly lean matter (because they are generally not broken into small particles). Hence, these are referred to herein as lean particles. The change in physical breakdown of the beef particles into two types of particles is caused by lowering the temperature thereof followed by physical disruption of the bond, which fixes the fat and lean matter together in an attached state and results in a size difference between the larger lean particles compared to smaller fat particles.

It has been found that reducing the temperature of the beef pieces with fat to a range of, for example, between less than 29° F. and above 26° F. will facilitate separation by providing friable fat fractures permitting the fat to crumble into small particles, leaving the lean as larger particles.

The chiller 108 may be a cryogenic freezer using nitrogen or carbon dioxide as the refrigerant, such that upon transfer out of the chiller 108 (or other style of freezer) the temperature of the fat (at its surface) is lower than the temperature of the lean in each particle or separate piece of beef. In one embodiment, the beef particles are temperature reduced by transfer through chiller 108 such that the surface temperature of the fat matter is lower (approximately 5° F.) than the surface temperature of the lean matter, which is shown to be about 29° F., immediately following discharge from the freezer. The temperature at the surface of fat may be at about 5° F. or less and up to 10° F. or more such that it can be friable and crumble upon application of pressure, while the temperature of the lean may be 16° F. to about 34° F., for example, or alternatively below 29° F., which makes the lean flexible and not frozen into a "rock-hard" condition immediately after removal from the freezing process.

The temperature reduced beef pieces can then be, without storing in containers or otherwise that could allow temperature equilibration of the fat and the lean matter so as to become less than rigid, transferred through the bond breaking process during which the beef pieces are "flexed" or bent by distortion and partially crushed as they are transferred between, for example, a pair (two) of parallel rollers manufactured from any suitable stainless steel such SS316 or SS304 grades, but wherein the beef pieces are not completely flattened as would occur if placed on a hard surface and rolled upon with a very heavy roller (steam/road roller for example). This bond breaking compression process is intended to cause breakage of the friable fat matter into smaller pieces of, in the majority of instances, approximately 100% fatty adipose tissue (fat) and smaller than the fat matter was before transfer through the bond breaking process and much more so than the lean matter, which remains in most cases intact but without any more than about 10% fat or less, remaining attached to the majority of lean matter after transfer through the bond breaking process. In other words, the fat in the beef pieces will "crumble," fracture, and break into small pieces and separate from the lean in a continuous stream of what becomes small (smaller than before transfer through the crushing process) fat particles, and the remains are lean particles that still comprise some fat but are approximately more than 90% lean beef.

At the exit of the chilling tunnel 108, the temperature-reduced beef pieces are crushed between rollers in the bond-breaking device 110. The bond-breaking device is for reducing the size of beef into particles, wherein the beef pieces are reduced to particles are either predominantly fat particles or predominantly lean particles. Bond-breaking device 110 includes one or more pairs of opposed rollers, wherein teeth are disposed along the longitudinal direction of each opposed roller. Each individual teeth can run the length of the roller. The intermeshing teeth are in close, but not touching proximity with the teeth of the opposed rollers. The diced and chilled beef pieces leaving the tunnel chiller 110 are deposited by gravity into the gap between the rollers of the bond-breaking device 110. Processing in the bond-breaking device 110 results in the liberation of the fat from the beef pieces, thereby resulting in fat particles and lean beef particles, that formerly comprised the fat particles. Rollers that contact the beef pieces can be smooth or comprise teeth extending the length of the roller. The gap between opposing teeth can be determined based on the size of the fat particles that come from the outlet of the bond-breaking device 110. If the fat particles are too large, the spacing between the opposed rollers can be decreased to reduce the size of fat particles. If the fat particles are too small and/or lean is combined with the fat, then the spacing of the intermeshing teeth can be increased.

FIG. 1 shows the end view of a pair of rollers that may be used in one embodiment of the bond breaking apparatus. A pair of shafts can be mounted in bearings (not shown) with a timing belt drive arranged to rotate two pairs of rollers in opposite directions. The distance between the perpendicular centerline of each roller is held in a selected position such that protrusions and recesses in the opposite rollers are adjacent to each other as the rollers rotate and provide a gap.

The length of any protrusion can be less than the length of any recess such that the distance between the rollers provides a clamping force that can be applied to the beef pieces transferred therebetween but no damage such as cutting the beef occurs. All corners are radiused heavily, and this further limits the capacity of the rollers to damage the beef product by cutting while performing crushing to liberate the friable fat matter from the beef pieces, leaving mostly lean matter and little fat matter on the beef pieces.

The temperature of the individual beef pieces is controlled such that the lean matter of the beef piece will remain flexible and not be prone to breakage or shattering, while the fat matter is brittle and friable and prone to breakage and will fracture and shatter into small particles. In one embodiment, the bond breaking compression device includes intermeshing teeth, either on opposed rollers, or on top and bottom threads running parallel in a continuous manner. The spacing of the teeth can be determined based on the size of the fat particles that are shattered coming from the outlet of the bond breaking compression device. If the fat particles are too large, the spacing between the teeth can be decreased to reduce the size of fat particles. If the fat particles are too small and/or lean is combined with the fat, then the spacing of the intermeshing teeth can be increased.

Figure 2:
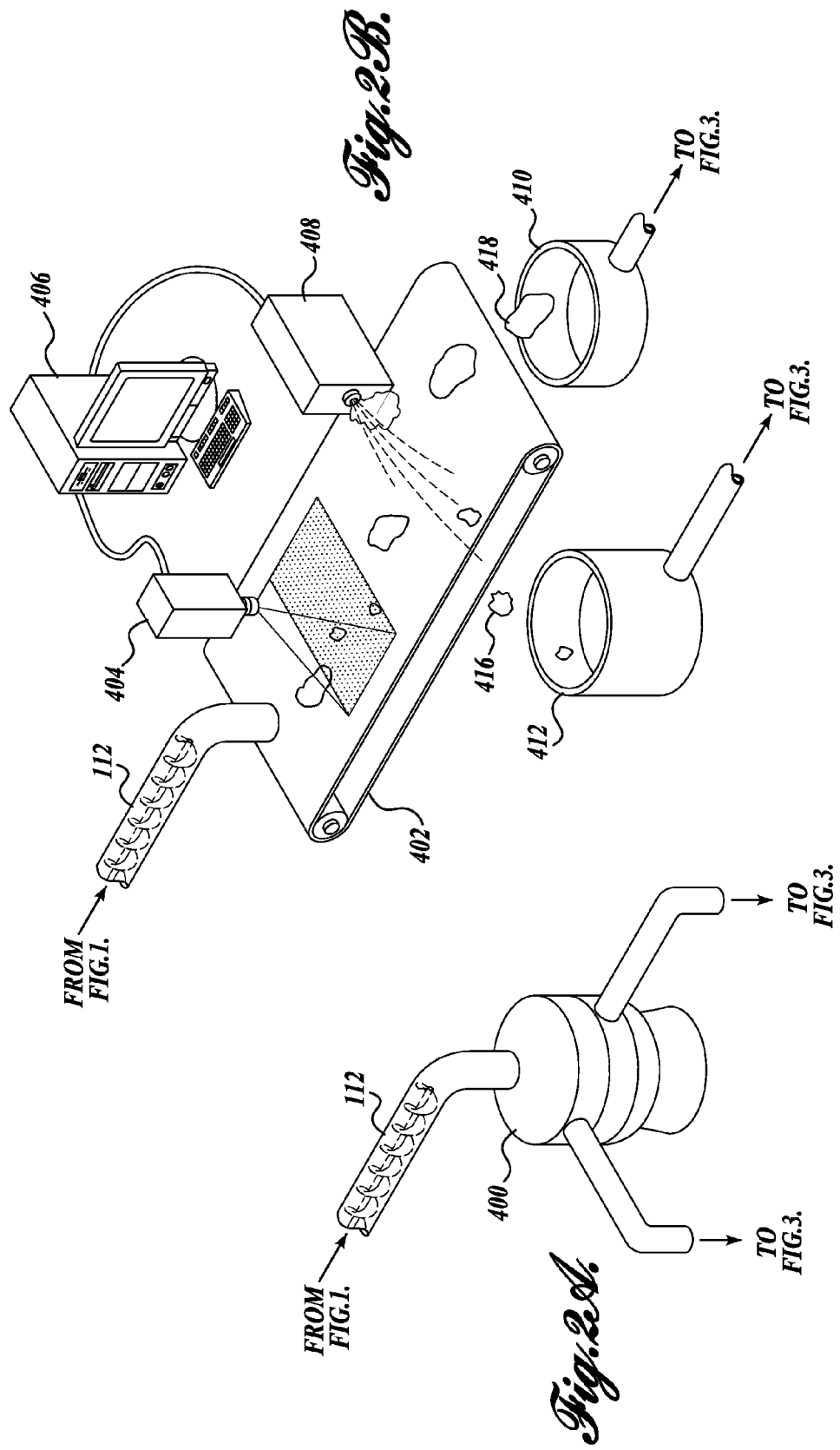
FIG. 2A is a schematic illustration of a process for the separation of lean beef from boneless beef containing lean beef and tallow.
FIG. 2B is a schematic illustration of a process for the separation of lean beef from boneless beef containing lean beef and tallow.

In one embodiment, the fat particles and the lean beef particles exit the bond-breaking device 110 and are deposited to an enclosed screw conveyor 112, which is shown on FIGS. 2A and 2B. FIGS. 2A show two alternatives for separating the fat particles from the lean particles based on size differences, or color differences.

In the embodiment of FIG. 2A, the liberated fat particles and the larger lean particles may be deposited onto a vibratory sieve 400 with a mesh screen having holes large enough for the fat particles to pass through, but not the larger lean beef particles. The size of holes of the mesh screen may be selected having smaller holes to retain more of the fat particles with the lean particles and thus have a relatively high fat product, and the size of the holes of the mesh screen may be selected having larger holes to allow more, if not most or all, of the fat particles to pass through, and very little fat, if any, remains with the lean particles to produce a relatively low fat product.

A vibratory sieve is an apparatus that can separate particles of different sizes by allowing the smaller particles to pass through a mesh screen of a particular size, while the mesh screen does not allow the larger particles size to pass through. The disclosed method of producing the fat particles results in relatively smaller fat particles, compared to particles that comprise mostly lean beef. In the disclosed method, different particle sizes from fat-containing beef pieces are produced, and, further, the particle sizes produced correspond to whether the material is fat or lean. In the disclosed method, fat particles are produced that are, on the whole, smaller than the particles comprising mostly lean beef. The vibratory sieve can separate by a combination of motions that result in stratification of the smaller particles in one stratum, and the larger particles in a different stratum. The smaller particles are allowed to pass through the sieve and are collected in one outlet and are sent to the fat vessels 148A, B in FIG. 3. The lean particles are collected in a second outlet and are sent to the lean vessels 144A,B in FIG. 3 While one representative embodiment of a sieve to separate according to size difference is illustrated and described, it should be appreciated that other methods and apparatus may be used for separation small particles from a mixture of small and large particles.

FIG. 2B is an illustration of an another embodiment for separation of fat particles and lean particles. The mixture of fat particles and lean particles are deposited onto a conveyor 402. In one embodiment, the particles can be deposited linearly in a row along the direction of travel of the conveyor to form a row of individually arranged particles. The purpose for this will become apparent. The particles then pass underneath the field of vision of a camera, or other image-capturing, or video, apparatus 404. The images captured by the apparatus 404 can be analyzed via the use of a processor 406. The processor 406 is able to determine the color of the particle and, based on the color, make a determination whether the particle should be classified as a fat particle or a lean particle. Video image analysis and classification of animal carcasses is known. However, the disclosed method of producing fat particles results in fat particles that are essentially of a single uniform color (i.e., the fat particles do not comprise visual lean red meat), and therefore the color of the entire fat particle can be generally viewed as uniform. The color of particles that comprise mostly lean beef is also generally uniform throughout the entire particle. Such lean particles being the color of freshly cut lean red beef. In the disclosed method, particles of different colors are produced from fat-containing beef pieces, and further the particle color corresponds to whether the particle is generally essentially fat or lean matter. In the disclosed method, fat particles are produced that are, on the whole, a whitish or yellow color that is different from the generally red color of particles comprising mostly lean beef. In the disclosed method, the processor provides a determination whether each individual particle is one of two colors, which corresponds to whether the particles is one of two materials (fat or lean), which makes sorting reliable and efficient.

After a determination is made whether an individual particle is fat or lean, the processor 406 can communicate with a sorting apparatus 408, such as a pneumatic device that can direct a puff of compressed air (or any other gas) onto the particle 416, (for example, a fat particle) to remove the particle 416 from the conveyor 402. The particles that are blown off the conveyor 402 are collected into a bin 412, and are transferred to the fat vessels 148A,B in FIG. 3. A reason why the particles may be individually aligned single file on the conveyor is to provide a clear path for the particles to be removed, without interference from other particles that should not be removed from the conveyor. However, other configurations are possible, where more than one particle can be removed at the same time, and arranging particles single file may not be necessary. For example, the use of a robot with a claw can lift particles from the conveyor when particles may be arranged, or even scattered, across the width of the conveyor. Those particles that remain on the conveyor are the lean particles, for example, and are deposited onto the bin 410. From bin 410, the lean particles are transferred to the lean vessels 144A,B in FIG. 3.

To determine which particles are to be removed, the processor 408 may also keep track of particles. In one embodiment, keeping track of particles may be by way of a set of cameras, or video apparatus, that count the particles that pass underneath the classification imaging camera 404. For example, a first camera positioned so as to count a particle as it passes underneath the imaging camera 404, would identify the order of the particles, simultaneously as the processor 406 identifies it as being either a fat particle or a lean particle. For example, keeping track can be as simple as assigning a number, such as 1, 2, 3, and so on. If the imaging camera 404 classifies particle number 3 as needing to be removed, a second counting camera positioned down the conveyor from the imaging camera can similarly count the particles, and when particle number 3 is detected, the sorting apparatus 408 is activated to remove particle number 3.

The fat in vessels 148A and 148B may contain approximately 15% water and 10% to 15% by weight protein. This protein may be recovered in the low temperature rendering section of FIG. 4, and the recovered solids are reintroduced to the lean beef in vessels 144A,B.

Vessels 148A and 148B rest on load cells that determine when a vessel is filled to capacity. Only one vessel 148B or 148B is generally loaded with material at a time. When the vessel reaches capacity, a transfer valve 170 may automatically switch to the empty vessel. While one vessel 148B or 148B is being filled, the standby vessel may be emptied of material to be ready to receive material when the other vessel is filled to capacity. The bottom outlets of the vessels 148B and 148B share a common outlet to a pump 174. Pump 174 transfers the fat particles to a low temperature rendering system illustrated in FIG. 4, further described below.

Prior to or after the fat and lean particles are sent to their respective vessels, a process may be conducted to combine the lean particles with a measured amount of the fat particles, after the fat particles have been separated from the lean particles. The fat content of the lean particles and the fat particles can be measured via the use of Coriolis meters, and addition of fat can be undertaken to raise the fat content of the lean product stream to a desired level. This can be done by transferring fat from the vessels 148A,B to the lean product stream as it is being transferred into or out of vessels 144A,B. The fat content of the lean product stream may then again be measured to verify the level of fat.

Figure 3:
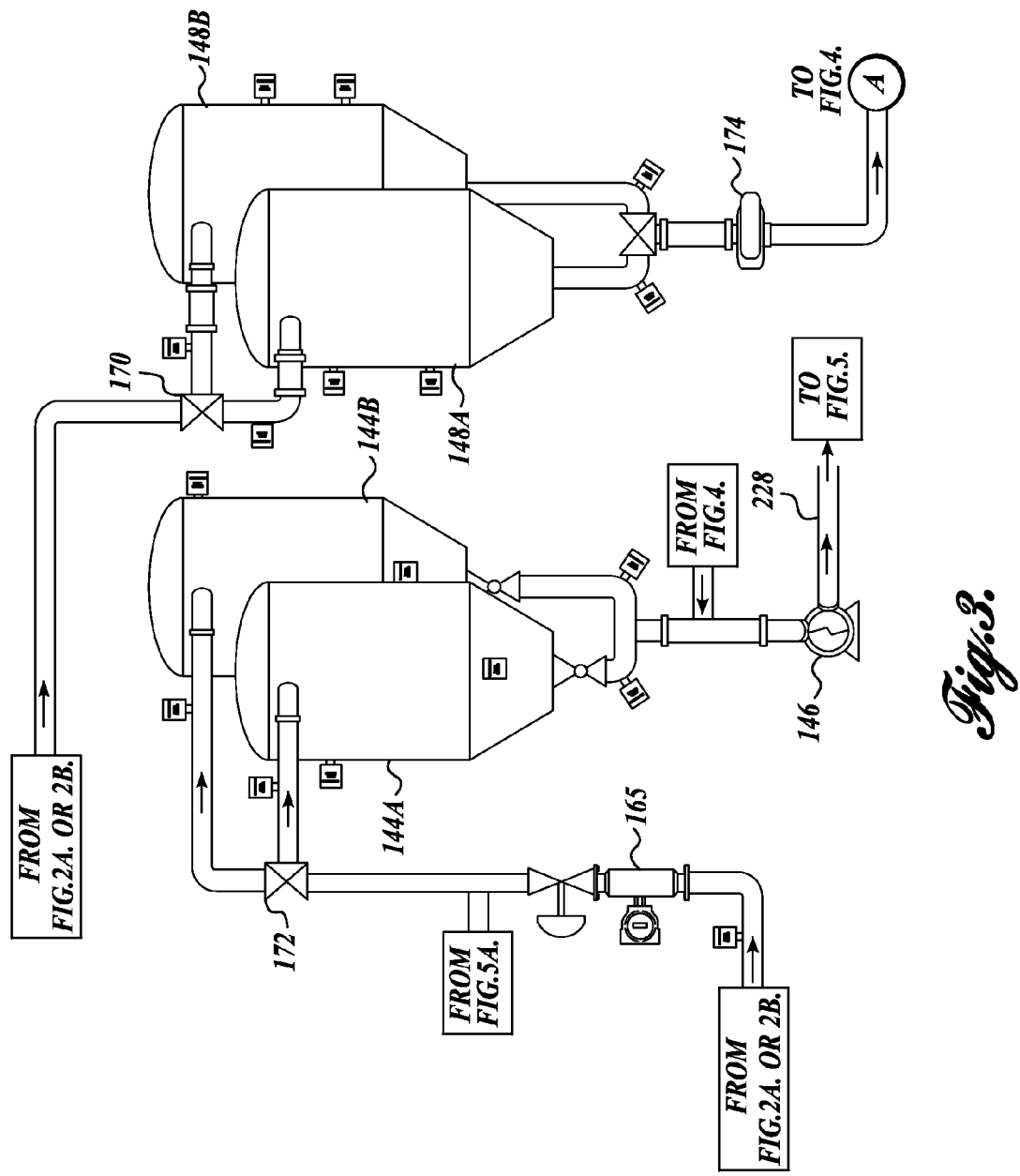
FIG. 3 is a schematic illustration of a process for the separation of lean beef from boneless beef containing lean beef and tallow.
Figure 4:
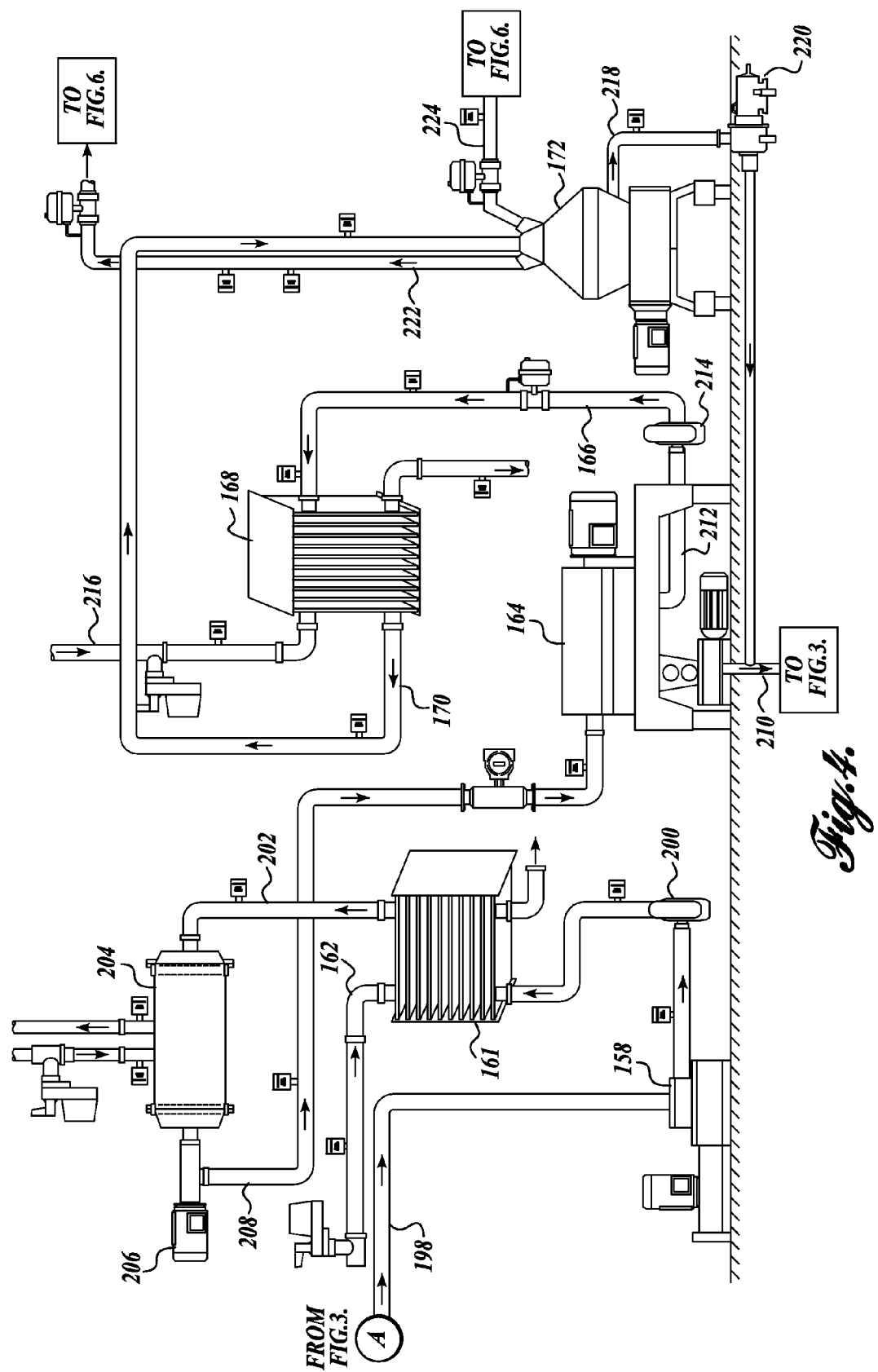
FIG. 4 is a schematic illustration of a process for the separation of lean beef from boneless beef containing lean beef and tallow.

As described in connection with FIG. 3 above, the fat particles from the fat reservoir vessels 148a and 148b are transferred to a low temperature rendering system. This system is illustrated in FIG. 4. The fat reservoir vessels 148A and 148B are emptied by transferring the fat particles via the conduit 198. The conduit 198 leads into a variable speed emulsifier 158. Emulsifier 158 applies a shear force on the fat particles, generally by the application of a sharp rotating edge. The shear action breaks the walls of any fat cells to produce an emulsification of oily material and solids. The fat material is reduced to an emulsion, which is then transferred via pump 200 to one side of a plate heat exchanger 161. Recirculating water is metered and temperature controlled to the plate heat exchanger 161 via conduit 162. The heated fat emulsification leaving the plate heat exchanger 161 through conduit 202 is approximately 108° F. to 180° F. The oily material may be pasteurized by the plate heat exchanger 161.

The fat emulsification transferred through conduit 202 enters a Votator scraped surface heat exchanger 204. In scraped surface heat exchange 204, the fat emulsification is further heated to approximately 160 to 190° F. The fat emulsification from scraped surface heat exchanger 204 is then transferred via conduit 208 to a decanter centrifuge 164. Decanter centrifuge 164 separates solids from the fat emulsification. The solids leaving the decanter centrifuge 164 may be considered lean finely textured beef (LFTB). This LFTB includes connective tissue, water, cell walls, and protein. This LFTB may be considered lean beef and typically has some fat with it. The solids (LFTB) leaving the decanter centrifuge 164 via outlet 210 may be combined with the lean particles in the lean reservoir vessels 148A and 148B. Alternatively, the solids (LFTB) may be considered a separate product.

The decanter centrifuge 164 separates the fat emulsification via outlet 212. The fat emulsification at this point may be tallow, with the solids removed. The tallow removed via conduit 212 is pumped via pump 214 into conduit 166. Conduit 166 transfers the fat emulsification into a second plate heat exchanger 168. The second plate heat exchanger 168 heats the fat emulsification to approximately 160 to 190° F., and in any event the temperature is raised to pasteurize the tallow. Hot water is provided to the second plate heat exchanger 168 via the hot water recirculation system via conduit 216. The water is returned from the plate heat exchanger 168 to the hot water recirculation system. The tallow leaves the second plate heat exchanger 168 via conduit 170. Conduit 170 transfers the heated tallow into the disk centrifuge 172.

The disk centrifuge 172 separates further solids via outlet 218. Solids separated by the disk centrifuge 172 and transferred via conduit 218 are pumped via pump 220 and combined with the solids (LFTB) from the decanter centrifuge 164. The combined solids may be reintroduced into the reservoir vessels 144A and 144B containing the lean particles. Alternatively, the solids (LFTB) are packaged and considered a separate product from the lean beef. Water is separated from the disk centrifuge 172 via conduit 224.

The emulsifier 158 is used to break cell walls of fat to release oil. The solids including the cell walls are transferred with the solids, and will separate in the decanter centrifuge 164 and/or the disk centrifuge 172. The oil, which is essentially tallow, is separated from the disk centrifuge via conduit 222 and sent to oil storage vessels 230a,b of FIG. 6. The oil thus produced has many uses. Being food grade, the oil may be used in the manufacture of any type of food, such as snacks, used as commercial cooking oil, as a flavor additive, or any other application of a food-grade oil. Additionally or alternatively, the oil may be used in the production of biodiesel.

Figure 6:
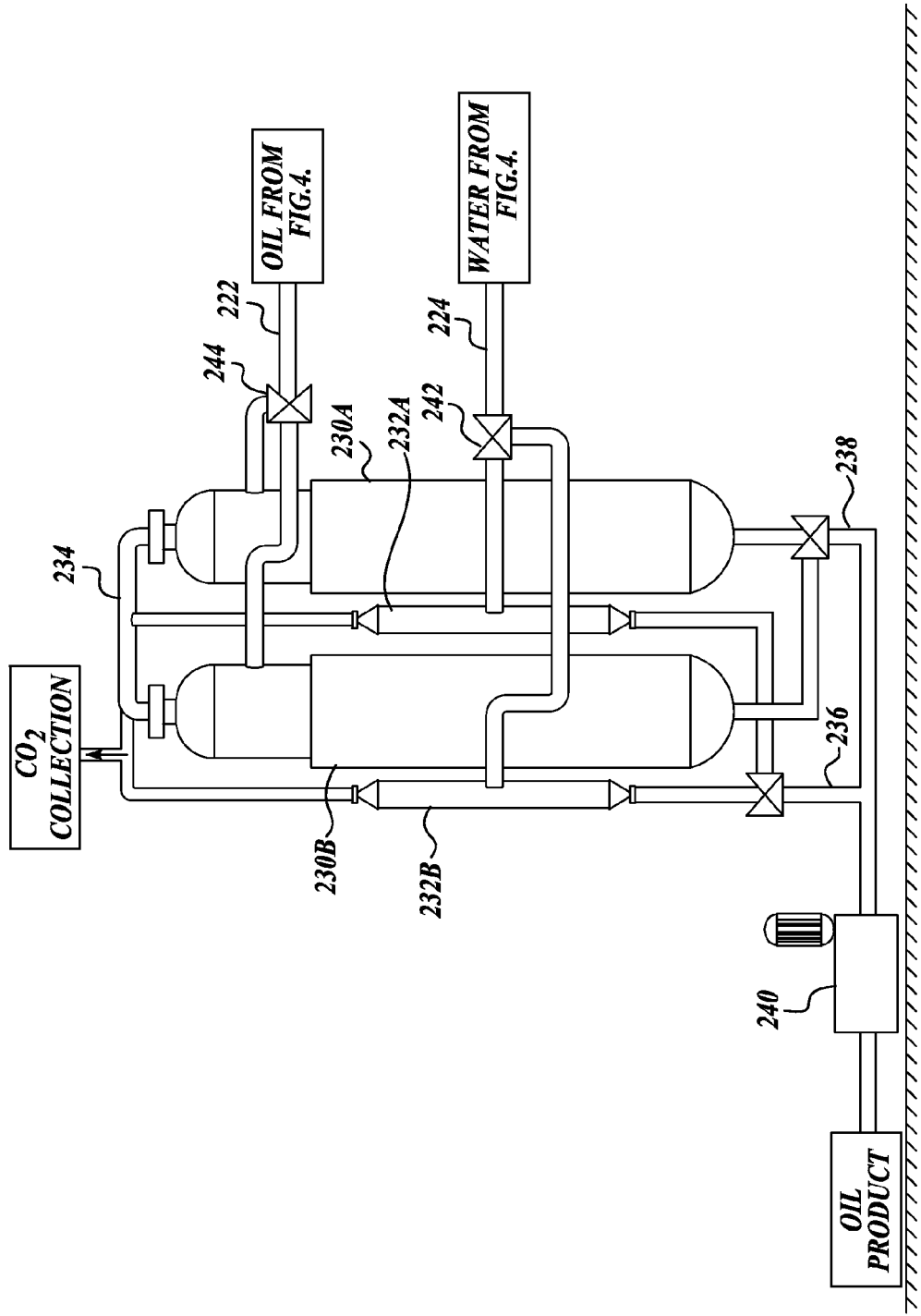
FIG. 6 is a schematic illustration of a process for the separation of lean beef from boneless beef containing lean beef and tallow.

Referring to FIG. 6, the oil separated from disk centrifuge 172 in FIG. 4 is transferred via conduit 222. As seen in FIG. 6, the conduit 222 leads to one of two vessels 230A and 230B. The oil from conduit 222 may enter either one of two oil storage vessels 230A or 230B. Storage vessels 230A and 230B may sit on load cells. Load cells can be used to determine when the vessels 230A and 230B are filled to capacity. The water separated from the disk centrifuge 172 (FIG. 4) is transferred via conduit 224. Conduit 224 leads to one of two vessels 232A and 232B. Vessels 232A and 232B may sit on load cells that are used to determine when the vessels 232A and 232B are filled to capacity. When the load cells detect that the vessels are at capacity, a valve 242 may switch automatically to stop filling the vessel that is at capacity and start filling the empty vessel.

Oil storage vessels 230A and 232B may each have a capacity of approximately 200 gallons, while water storage vessels 232A and 232B may have a capacity of about 15 gallons each. The tops of the vessels 232A, 232B, 230A, and 230B may all be connected at the top end thereof to a common manifold 234. Manifold 234 may lead to carbon dioxide collection.

Vessels 230A and 230B each have an outlet at the bottom end thereof that is combined into a conduit 238. Vessels 232A and 230B have a common outlet 236.

The oil being separated by the disk centrifuge 174 may have little to no water. Accordingly, water that has been initially separated from the fat cells in the emulsification and rendering section may be returned at a rate to achieve an approximately 15% by weight water content in oil for a final composition of approximately 85% by weight oil, and 15% by weight water. If water is added to the oil, the combination may be treated by a homogenizer 240 to introduce the water back into the oil. The homogenized oil/water may be used as an ingredient in many products.

The lean particles from either separation process of FIGS. 2A, or 2B travel through a Coriolis meter 165 for massflow measurement. The lean particles are then stored in either of reservoir vessels 144A or 144B. Vessels 144A and 144B rest on load cells which determine when a vessel is filled to capacity. Only one vessel 144A or 144B is generally loaded with material at a time. When the vessel reaches capacity, a transfer valve 172 may automatically switch to load the empty vessel. While one vessel 144A or 144B is being filled, the standby vessel may be emptied of material to be ready to receive material when the other vessel is filled to capacity. The bottom outlets of the vessels 144A and 144B share a common outlet to a pump 146. Pump 146 transfers the lean beef particles to a vessel, such as one illustrated in FIG. 8 that is for the purpose of treating the lean beef with supercritical carbon dioxide to reduce pathogens, and will be described later. However, other methods for treating the lean particles to reduce pathogens are possible. It can be advantageous to pathogen reduce the lean beef separate from the fat, since the fat may undergo pasteurization through heating, while heat will detrimentally affect the quality of raw beef.

Figure 7:
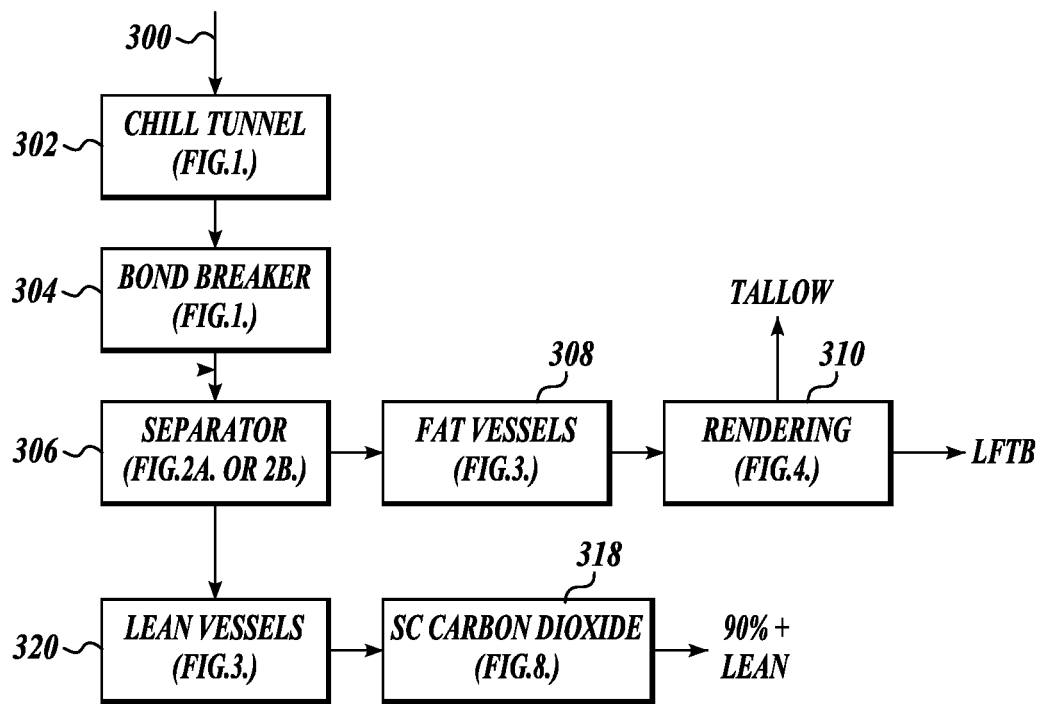
FIG. 7 is a schematic illustration of a process for the separation of lean beef from boneless beef containing lean beef and tallow.

Referring to FIG. 7, a method for separating fat from lean beef while minimizing the loss of micronutrients from the lean beef is illustrated.

The method begins by introducing pieces of beef 300 into a chilling tunnel, block 302. The apparatus for performing this step is illustrated in FIG. 1. However, other apparatus are suitable. As described in association with FIG. 1, the purpose of the chilling tunnel is for reducing the temperature of the beef pieces to a temperature at which the fat can be broken off from the lean beef while the lean beef remains essentially pliable and does not break into smaller particles. From block 302, block 304 is entered.

In block 304, the beef pieces are processed by an apparatus that is capable of breaking the bonds between fat and the lean matter. One embodiment of an apparatus for performing this "bond-breaking" process is illustrated in FIG. 1. However, other apparatus are suitable. As described in association with FIG. 1, the bond-breaking apparatus can include two sets of parallel spaced-apart rollers with or without intermeshing teeth and through which the beef pieces are dropped therebetween after being temperature-reduced in the chilling tunnel. From block 304, block 306 is entered.

Block 306 is for separating the fat particles from the lean particles. Various embodiments of apparatus capable of achieving such separation are described in association with FIGS. 2A, and 2B. However, other apparatus are suitable.

From block 306, the separated fat particles are transferred to the fat vessels, block 308. The fat vessels for weighing the fat are described in association with FIG. 3.

From block 308, block 310 is entered. Block 310 is for rendering the fat particles into tallow, and lean, finely textured beef. Apparatus suitable for rendering the fat particles into both tallow and lean, finely textured beef is described in association with FIG. 4. However, other apparatus is suitable.

From block 306, block 320 is also entered. Block 320 is for weighing the lean particles in vessels. Apparatus for weighing the lean particles is described in association with FIG. 3. From block 320, block 318 is entered.

Block 318 is for treating the lean particles to reduce pathogens. In one embodiment, the lean particles can be treated with carbon dioxide at supercritical conditions, i.e., above the critical temperature and pressure of carbon dioxide. The separation method disclosed herein can achieve the production of diced beef having a content of approximately 90% or more by weight of lean beef. Additionally, the disclosed method can be used to product tallow and lean, finely textured beef (LFTB) from fat.

Figure 8:
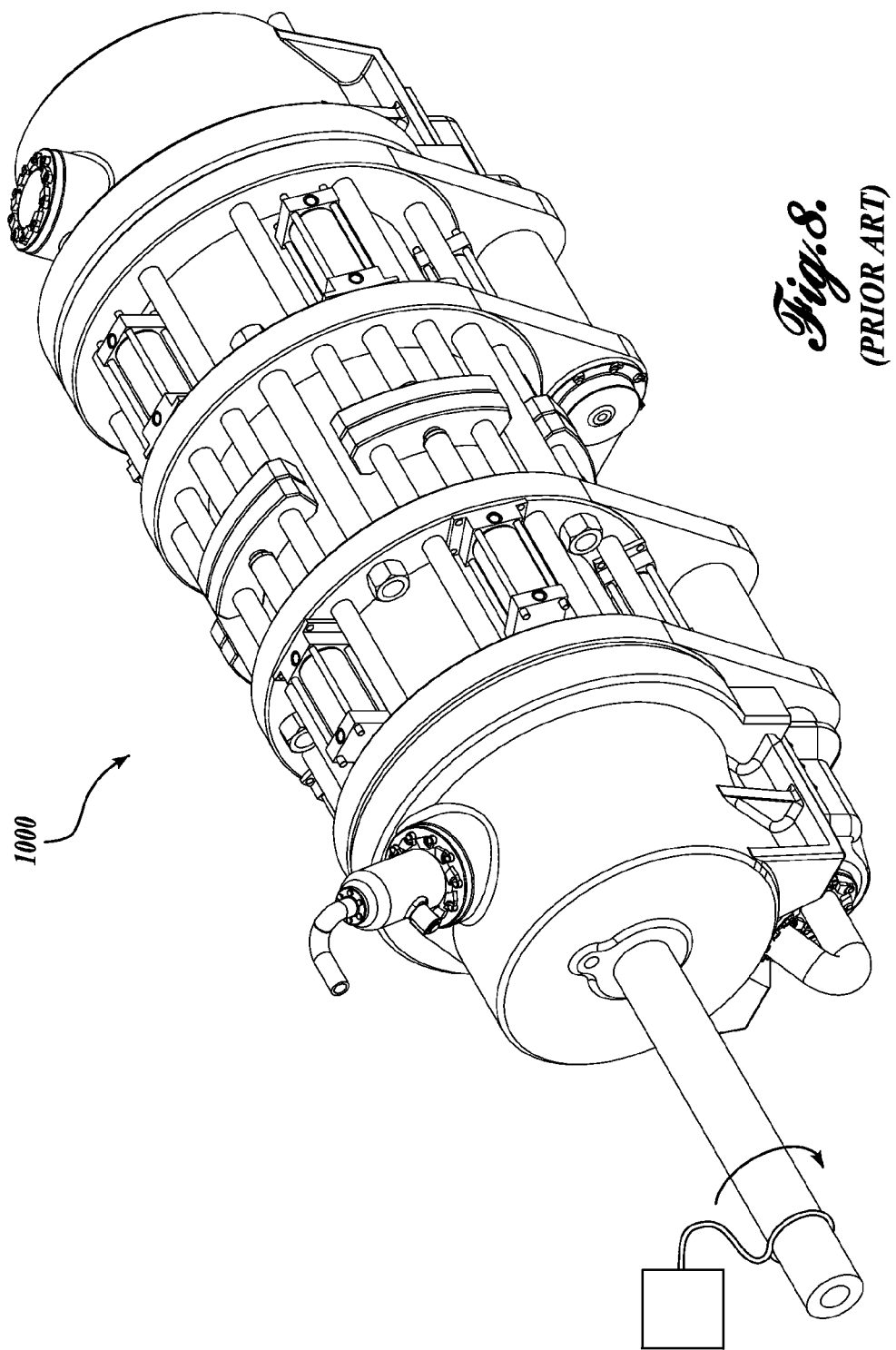
FIG. 8 is a schematic illustration of apparatus for the treatment of lean beef with supercritical carbon dioxide.
Figure 9:
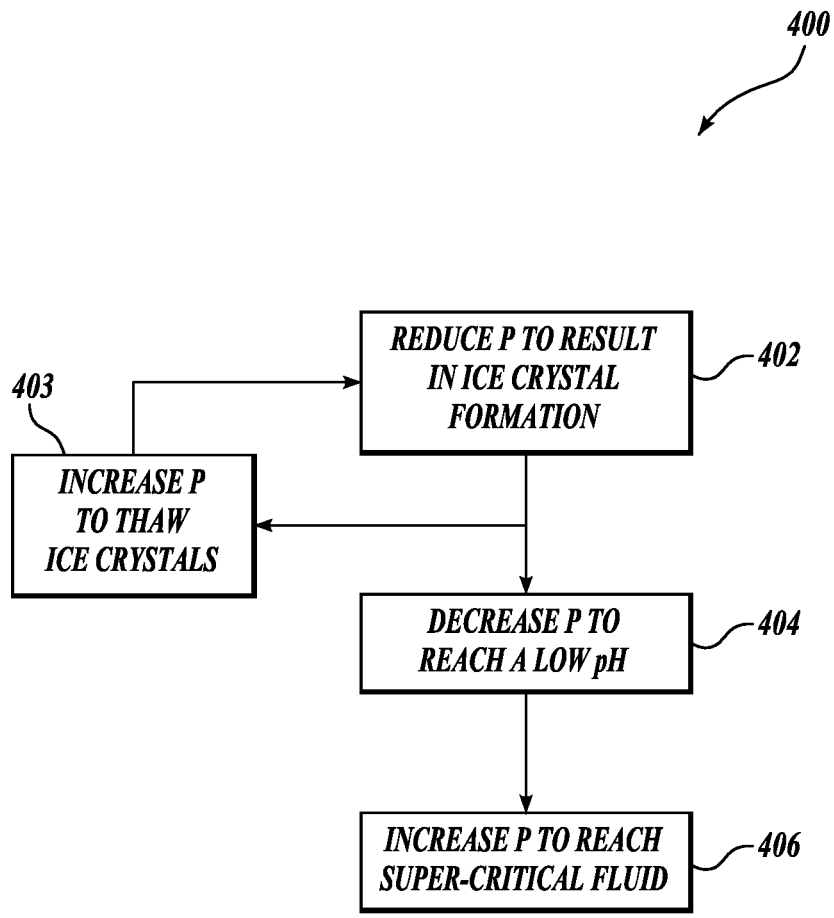
FIG. 9 is a schematic illustration of a process for the treatment of lean beef with supercritical carbon dioxide.

Referring now to FIGS. 8, and 9, an apparatus 1000 and method 400 for decontaminating lean beef with supercritical carbon dioxide are illustrated. The apparatus 1000 is used for separately treating the beef from fat for pathogen deactivation.

Boneless beef, as provided after a carcass has been processed to remove the primals, when infected with Pathogens, such as E. Coli 0157:H7, will generally comprise a fat component which will likely include a predominant proportion of the total pathogen population while the lean component will likely comprise a lower pathogen population. This occurs because pathogen contamination generally occurs due to contact with any vector of pathogen contamination by the outer surface making contact therewith. The outer surface of a beef carcass is generally substantially covered with a fat layer hence the fat component of boneless beef and trim will often comprise the major proportion of any pathogen contamination contained with a given quantity of boneless beef. Separating the fat component from the lean component can, therefore, provide a means of dividing the pathogen population with a greater proportion carried with the fat component and less with the lean beef component. The fat component includes protein of significant value, even after separation from the lean component and fat with proteins can be heated to higher temperatures compared to lean beef, such as above a pasteurization temperature of 160° F. and higher. However, the lean component cannot be heated without causing unacceptable changes in color and composition. Therefore, the proteins contained in the fat component can be separated and then recombined with the lean component without affecting the finished high lean content product. Furthermore, when 30's (XF's) or 50's boneless beef are separated into two streams of: 1) a fat and beef proteins (including chemical lean) component; plus, 2) lean beef of approximately 90% or 93% lean content (visual lean), an opportunity to subject each stream to different pathogen deactivation treatments is available. Most preferably, the fat stream (with proteins) can be pasteurized by elevating the temperature of the stream to above a pasteurization temperature of greater than 160° F. while the heat sensitive lean stream can be most preferably treated to reduce pathogen populations in supercritical carbon dioxide and, according to the method described in the applicant's U.S. Pat. No. 8,101,220, to undetectable levels while the predominantly fat stream (and any proteins) can be pasteurized thermally by increasing its temperature to greater than 160° F. or greater than 190° F. Accordingly, after separation of the lean component from the fat component, followed by separation of the lean stream from the fluid with which it (and the fat stream) was combined prior to separation of fat from lean, the lean component can be immersed in supercritical carbon dioxide according to a treatment described in the referenced '220 patent. Applicant's U.S. Pat. No. 8,101,220, entitled TREATMENT TO REDUCE MICROORGANISMS WITH CARBON DIOXIDE BY MULTIPLE PRESSURE OSCILLATIONS, which is hereby incorporated with this patent application for all purposes, can effectively reduce pathogen populations to undetectable levels without affecting the appearance of the lean component. Separately, the fat stream, which can contain substantial quantities of proteins, can be homogenized and then pasteurized by heating to an elevated temperature of greater than 190° F. or at least above 160° F. or higher such as 200° F. or more, which will render all pathogens inactive. The heat pasteurized stream of fat and proteins is then centrifuged to separate the liquid fat (tallow) from the proteins and any remaining water. The proteins and water can then be recombined with the lean stream without any deleterious effect on appearance of the fresh lean beef.

The apparatus 1000 and method 400 are described in applicant's U.S. Pat. No. 8,101,220. For brevity, the apparatus 1000 will not be described, as it is fully disclosed in the '220 patent, and reference may be easily made. In general, any device that is capable of achieving the critical temperature and pressure of carbon dioxide is suitable. The illustrated device is capable of achieving such carbon dioxide critical temperature and pressure via the use of hydraulically-activated pistons that compresses a space filled with carbon dioxide fluid and the lean beef. It should be noted that the apparatus 1000 may use a substantially incompressible fluid, such as potable water, that will not render inedible the lean beef should a hydraulic fluid leak occur.

The apparatus 1000 can be used to destroy or render harmless viruses such as hepatitis, malaria, tuberculosis, the SARS virus, and also the extraction of prions that may have become mixed with the lean beef. Such prions may be the cause of BSE (bovine spongiform encephalopathy). It is well known that in order to destroy BSE prions, they must be heated to a very high temperature and to such an extent that the molecule will change form by decomposition or reaction with other elements or compounds. However, such temperatures cannot be applied to food, such as boneless lean beef, and therefore the preferred means of dealing with such a food safety matter can occur by removal from the food stream. In the event that such prions are known to be present with any food, the food product must be removed from the food chain and dealt with as required according to USDA regulations. However, the apparatus 1000 may provide a useful precautionary means of washing boneless beef portions with supercritical carbon dioxide (carbon dioxide above the critical temperature and pressure) and then separating the lean beef from fluidized extracts collected in a stream of carbon dioxide fluid.

Referring to FIG. 9, a method for treating lean beef with fluid carbon dioxide, including supercritical carbon dioxide, is illustrated. A method in accordance with one embodiment includes introducing boneless beef, carbon dioxide, and, optionally, water under pressure in the range of 200 psig to 500 psig, or, alternatively, thereafter raising the pressure of carbon dioxide within the apparatus illustrated in FIG. 8 such that when the pressure is reduced, the water that is on the surface of the goods will freeze, block 102. However, the reduction in pressure is controlled so that there is insubstantial freezing of the water below the surface.

In accordance with this embodiment, when the water freezes on the surface of the boneless beef, wherein microorganisms may reside, needle-like ice formations of microscopic size form in a random pattern. As the freezing process of water continues, the needle-like ice formations become part of the solid ice that can form when all water present is frozen solid. The needle-like ice crystal formations perforate the microorganisms' cell walls and membranes. When the ice crystals thaw and defreeze, the perforations are left behind allowing low pH dense carbon dioxide or supercritical carbon dioxide to enter the microorganisms through the perforations. A pH differential of at least about 1 or less can detrimentally affect or damage the microorganisms, so too can the supercritical carbon dioxide solvent when it enters the microorganisms. Furthermore, pH fluctuations of at least about 1 between the inside of cells and the outside of cells can cause further damage. To cause the needle-like ice crystal formations, liquid or dense carbon dioxide is in contact with the surfaces of the beef in sufficient quantities to cause freezing of the free water that is in contact with the microorganisms. To this end, free water may be added to ensure that all the surfaces of the beef that potentially could have been contaminated have a thin layer of water that surrounds and is in contact with the microorganisms. Such water later freezing and causing damage to the microorganisms. It is intended that a feature of the apparatus now being described is the capability to cause the partial freezing of water by rapidly elevating and reducing the pressure of the water and carbon dioxide with the boneless lean beef. More particularly, a reciprocating action of pistons in the apparatus 1000 can be arranged to cause partial freezing of water provided therein, which is in direct contact with the surface of the boneless beef. Such reciprocating piston movement can also cause the flexing of the contents, and when bacteria cells are exposed to this physical action, the needle-like ice crystals can affect the bacteria cells in a detrimental manner, such as by puncturing the cell walls. The rapid formation of needle-like ice crystals corresponding with a pressure reduction, followed by the rapid elimination thereof, corresponding with an increase in pressure and temperature, can provide an environment lethal to single cell pathogens. The lethality of the environment is created due to several mechanisms that relate directly to the temperature and pressure of the carbon dioxide. For example, when the pressure of carbon dioxide is lowered to, for example, 300 psig, from an existing pressure of 1000 psig at 50 degrees F., the temperature of the lower pressure carbon dioxide will fall below the freezing point of water, therefore, causing ice crystals to form, block 402. When a mixture of the appropriate proportions of liquid phase carbon dioxide with liquid phase water and boneless beef, all held at a pressure of 1000 psig and temperature of 40 to 50 degrees F., and the pressure is reduced to, for example, from 300 to 400 psig, the temperature of the carbon dioxide will drop to below 20 degrees F., and when sufficient carbon dioxide is present with the liquid phase water, ice crystals will form. Ice crystals formed in this manner can have needle-like characteristics easily capable of rupturing the cell wall of a pathogen, such as *E. coli* 0157:H7. Before substantial freezing of the food below the surface can occur, the pressure is rapidly elevated to raise the temperature, block 403. The cycle can be repeated as many times as is desired. With the apparatus 1000, the pressure of carbon dioxide can be oscillated, wherein the upper and lower pressure limits are selected below the super critical phase of carbon dioxide. The lower pressure limits can be selected so as to ensure formation of ice crystals when the pressure is oscillated to a low pressure, and the upper pressure limits can be selected so that the ice crystals are substantially eliminated when the pressure is oscillated to a higher pressure. Such oscillation between low and high pressures can cause a corresponding oscillation of freezing and thawing temperatures. Any water mixed in or on the surface of the goods will freeze when the temperature at the lower selected pressure is sufficiently below the freezing point of water, and the water will thaw when the temperature at the higher pressure is sufficiently above the temperature at which water will freeze. When carbon dioxide and water are mixed together and are present at the surface of goods, such as meat (or fruits and vegetables), the ice crystals formed can, due to the needle-like morphology that ice crystals so formed can create, be lethal to bacteria by rupturing the cell walls thereof.

In another embodiment, the pressure and temperature conditions can be adjusted such that carbon dioxide, water, and boneless beef are retained under elevated pressure of, for example, up to, but less than approximately 1000 psig, such that the carbon dioxide and water react together to form carbonic acid having a pH in the range of about 2 to about 5, preferably about 3 to about 4. Alternatively, the pH can be less than 3, 4, or 5. The pH range can be about 2 to about 5, or any value in between. The hydrated carbon dioxide ($CO_2.H_2O$), or more correctly $H_2CO_3$, is a defined compound having dissociated ions represented by [$H^+$] [$HCO_3^-$] at 1000 psig. This condition results in a lowering of the pH that affects pathogens in a detrimental manner and, if sufficiently low, can be lethal to pathogens, in particular when the pathogens have been previously detrimentally affected or injured, such as by the puncturing of the pathogen cell wall membrane, as discussed above. The needle-like ice crystals are capable of injuring pathogen cells by puncturing the cell walls, and when this condition is followed immediately by an elevated pressure of approximately 1000 psig, the resultant lower pH can more readily access the internal regions of the pathogen cell, thereby lowering the cell pH sufficient to cause death of the pathogen. The raising of the pressure to levels of about 1000 psig to cause a low pH can be affected by the apparatus 1000.

In yet another embodiment, a different set of temperature and pressure conditions can be achieved within the apparatus 1000 that affects the microorganisms in a detrimental manner, block 406. When carbon dioxide is pressurized above about 1100 psig and heated above about 88° F. (or 36° C.), i.e., the critical pressure and temperature of carbon dioxide, carbon dioxide is a supercritical fluid. Supercritical carbon dioxide is detrimental to bacteria, such as *E. coli* 0157:H7, when the bacteria are exposed to a sufficient quantity of the supercritical carbon dioxide. In this embodiment, a blend of carbon dioxide, water, and boneless beef are provided to the apparatus 1000. The pressure is elevated above 1056 psig at a temperature greater than 88 degrees F., i.e., greater than the supercritical pressure and temperature of carbon dioxide. At the supercritical conditions, the carbon dioxide possesses aggressive solvent properties capable of dissolving lipids. The cell walls of pathogens are constructed of a complex structure of lipids, and these cell wall lipids will dissolve when exposed to a powerful solvent, such as supercritical phase carbon dioxide. Supercritical pressure and temperature can be produced before or after any one of the other sets of conditions, discussed above, that detrimentally affect the microorganisms. Furthermore, all three sets of conditions can be sequenced in any order, as illustrated, and repeated any number of times, in the same, or a different sequence, or even one set of conditions may be repeated two or more times before changing to another set of conditions. In other embodiments, only the supercritical conditions need to be performed.

In summary, the apparatus 1000 can be used to provide one or more procedures, or any combination thereof, of varying pressure and temperature conditions of carbon dioxide that can destroy and deactivate microorganisms, and can be carried out in any order and repeated as many times as desired. Such procedures include: (1) oscillating between low and high pressure to cause ice crystal formation and thawing in rapid succession, (2) raising pressure to create a dense phase of carbon dioxide with a low pH, and (3) raising pressure to create supercritical carbon dioxide to affect the cell wall lipids of microorganisms.

The apparatus 1000 is capable of transferring boneless lean beef through a pressure vessel and oscillating the pressure between any lower pressure, such as about 300 psig, 350 psig, 400 psig, 450 psig, 500 psig, and so on, and up to an elevated pressure of about 1100 psig or greater, thereby causing multiple sets of circumstances to kill or reduce microorganisms, such as pathogens. Such lowering of pressure leads to temperature changes, such that at a lower pressure, ice crystals with needle-like characteristics will form, and, conversely, upon raising the pressure of carbon dioxide, a low pH acid is created at an elevated pressure of, for example, about 1000 psig and finally, by increasing the pressure and temperature to supercritical levels above 1058 psig and above 87.8 degrees F., lipid dissolving solvent characteristics are achieved. The raising and lowering of pressure to achieve ice crystal formation, low pH, or lipid dissolving solvent characteristics via carbon dioxide can be practiced in any order and repeated as many time as is desired, or any set of conditions can be practiced singly, and as many times or for a period to destroy or reduce microorganism populations in lean beef.

The process is not limited to being performed in any particular sequence. For example, pathogen deactivation may occur after separation, or any time before then. Some steps may be omitted and substituted for one or more steps that perform the similar function or are arranged in a different sequence to perform the similar function. Some steps may be omitted that are merely ancillary or embraced as a subsystem of the process as a whole.

Figure 5:
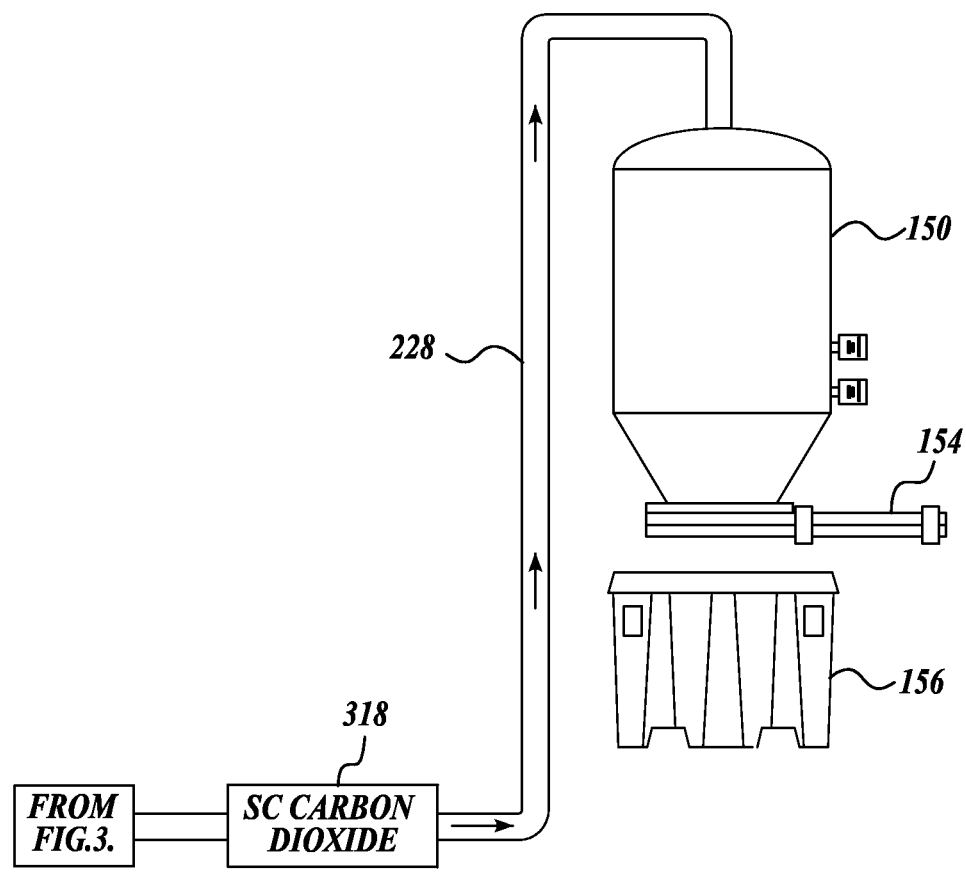
FIG. 5 is a schematic illustration of a process for the separation of lean beef from boneless beef containing lean beef and tallow.

Referring to FIG. 5, the finishing step for lean beef product is illustrated. As discussed above, lean beef can be processed using supercritical carbon dioxide in one embodiment, for example. Beef treated in the vessel 1000 of FIG. 8 is pumped to the top of vessel 150. Vessel 150 is operated under vacuum. The lean beef drops into the vessel 150. Vessel 150 may sit on load cells, which are capable of determining when the vessel 150 is filled to capacity. The vessel 150 is provided with a knife valve 154 at a bottom end thereof. When filled to capacity, the vessel 150 may be emptied onto totes 156 and carried away on trucks or by rail to predetermined destinations. The vessel 150 is connected to a conduit 152 that operates under vacuum. Any remaining carbon dioxide and/or water that may flash vaporize is carried away via vacuum conduit 152. Treating the lean particles under reduced pressure, such as vacuum, adjusts water content and lowers the temperature of the beef product to produce a controlled water content beef product.

The final lean beef product may contain 8% to 10% by weight fat. However, the fat content may be continuously measured and adjusted as necessary, for example, a controlled and measured quantity of fat particles that are collected in the vessels 148A,B may be combined with the lean beef product of vessels 144A,B.

The process is not limited to being performed in any particular sequence. For example, pathogen deactivation may occur after separation, or any time before then. Some steps may be omitted and substituted for one or more steps, or that perform the similar function, or are arranged in a different sequence to perform the similar function. Some steps may be omitted that are merely ancillary or embraced as a subsystem of the process as a whole.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for separating fat from beef pieces containing fat, comprising:
   chilling beef pieces containing fat and lean to a temperature at which fat will crumble and separate from the lean when a crushing force is applied;
   passing the chilled beef pieces within a gap created between a pair of spaced-apart opposed rollers, and with the rollers, reducing a size of beef pieces into a mixture of fat particles that comprise predominantly fat, and lean particles that comprise predominantly lean, wherein the fat particles are on average smaller than the lean particles;
   with an apparatus, separating the fat particles from the lean particles based on size differences between the fat particles compared to the lean particles; and
   emulsifying the fat particles into an emulsification of oily material and solids, pasteurizing the oily material and the solids, and centrifuging the emulsification to separate the solids from the oily material.

2. The method of claim 1, wherein the beef pieces are chilled to a temperature to render the fat brittle, and then the beef pieces are crushed to cause the fat to break away from the lean as small particles.

3. The method of claim 1, further comprising processing the mixture of particles in a vibrating sieve.

4. The method of claim 1, further comprising combining the solids with the lean particles.

5. The method of claim 1, further comprising combining the lean particles with a measured amount of the fat particles after the fat particles have been separated from the lean particles.

6. The method of claim 1, further comprising, after passing the chilled beef pieces within the gap created between the pair of spaced-apart opposed rollers, passing the chilled beef pieces within a second gap created between a second pair of spacedapart opposed rollers.

7. The method of claim 1, wherein the roller surfaces that contact the beef pieces comprise intermeshing teeth.

8. The method of claim 1, wherein the roller surfaces that contact the beef pieces comprise a smooth surface.

9. The method of claim 1, further comprising dropping via gravity the chilled beef pieces within the gap created between the pair of spaced-part opposed rollers.

10. The method of claim 1, wherein the rollers are counterrotating rollers.

11. The method of claim 1, wherein the rollers are co-rotating rollers.

12. A method for separating fat from beef pieces containing fat, comprising:
   with an apparatus, reducing a size of beef pieces containing fat into a mixture of fat particles that comprise predominantly fat, and lean particles that comprise predominantly lean, wherein the fat particles are on average smaller than the lean particles;
   with an apparatus, separating the fat particles from the lean particles based on size differences between the fat particles compared to the lean particles; and
   emulsifying the fat particles into an emulsification of oily material and solids, pasteurizing the oily material and the solids, and centrifuging the emulsification to separate the solids from the oily material.

13. The method of claim 12, further comprising combining the solids with the lean particles.

* * * * *